US009207141B2

(12) United States Patent
Gomez

(10) Patent No.: US 9,207,141 B2
(45) Date of Patent: Dec. 8, 2015

(54) BURST PRESSURE MONITORING DEVICE EMPLOYED IN A PRESSURE TRANSMITTER

(71) Applicant: Schneider Electric Industries SAS, Rueil Malmaison (FR)

(72) Inventor: Ernesto Gomez, Angouleme (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 95 days.

(21) Appl. No.: 14/170,839

(22) Filed: Feb. 3, 2014

(65) Prior Publication Data
US 2014/0251022 A1 Sep. 11, 2014

(30) Foreign Application Priority Data
Mar. 8, 2013 (FR) ...................... 13 52101

(51) Int. Cl.
G01L 7/00 (2006.01)
G01L 7/04 (2006.01)
G01L 19/06 (2006.01)

(52) U.S. Cl.
CPC .................................. G01L 19/0618 (2013.01)

(58) Field of Classification Search
None
See application file for complete search history.

(56) References Cited

U.S. PATENT DOCUMENTS 5,113,905 A * 5/1992 Pruitt et al. ................... 137/571
5,858,224 A * 1/1999 Schwandt et al. ............. 210/90
6,070,469 A * 6/2000 Taniguchi et al. .............. 73/720
6,216,541 B1 * 4/2001 Carpenter ........................ 73/741
7,832,617 B2 * 11/2010 Bessette ......................... 228/135
2003/0110864 A1 6/2003 Vujanic et al.
2014/0245707 A1 * 9/2014 Weh et al. ....................... 55/485

FOREIGN PATENT DOCUMENTS

WO WO 01/69194 A1 9/2001
WO WO 2012/089626 A2 7/2012

OTHER PUBLICATIONS

French Preliminary Search Report issued Nov. 13, 2013 in French Application 13 52101, filed on Mar. 8, 2013 ( with English Translation of Categories of Cited Documents and with Written Opinion).

* cited by examiner

*Primary Examiner* — Peter Macchiarolo
*Assistant Examiner* — Jermaine Jenkins
(74) *Attorney, Agent, or Firm* — Oblon, McClelland, Maier & Neustadt, L.L.P.

(57) ABSTRACT

The invention relates to a burst pressure monitoring device intended to be employed in a pressure transmitter (1), said pressure transmitter comprising a body (10), an inlet duct (11) formed on the body and intended to receive a fluid, a sensor member on which the inlet duct emerges, said sensor member being intended to measure a pressure and to deliver an output electrical signal representative of the measured pressure, said burst pressure monitoring device being intended to be positioned inside the inlet duct (11) of the pressure transmitter (1) and comprising two parts (21a, 21b) assembled together, the two assembled parts forming an internal fluid flow channel (22) comprising one or more successive chicanes (220).

4 Claims, 3 Drawing Sheets

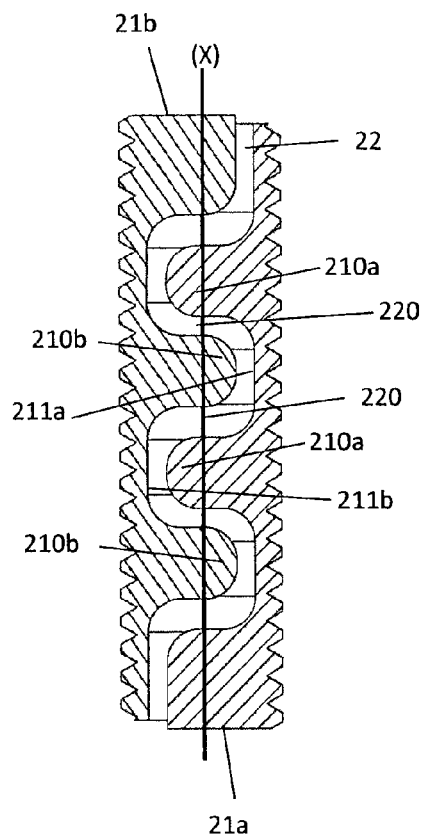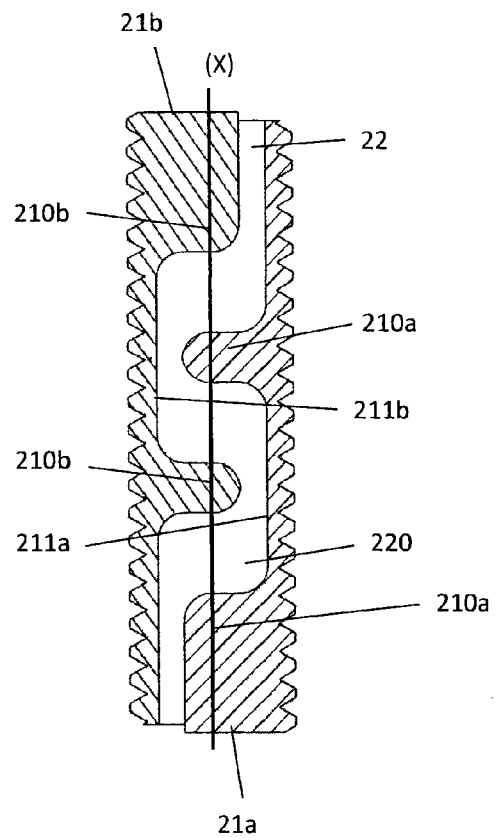
Fig. 4A
Fig. 4B

BURST PRESSURE MONITORING DEVICE EMPLOYED IN A PRESSURE TRANSMITTER

TECHNICAL FIELD OF THE INVENTION

The present invention relates to a burst pressure monitoring device employed in a pressure transmitter. This device will be employed in particular in the field of industry.

PRIOR ART

A pressure transmitter is intended to monitor and measure the pressure of a fluid circulating in a hydraulic or pneumatic system and to deliver an output electrical signal representative of the measured pressure. The output electrical signal is, for example, an analogue signal, generally between 4 and 20 mA.

The pressure transmitters have to be protected against any untimely burst pressure likely to damage them.

Various solutions exist in the prior art for monitoring the burst pressure and avoiding any damage to the transmitter. The conventional solutions consist in automatically closing the fluid inlet duct in burst pressure situations. Another solution consists in employing a disc which is calibrated to break in a burst pressure situation. Another solution consists in screwing into the inlet duct a member comprising a fixed part and a separable part, the separable part being detached from the fixed part in a burst pressure situation to block the outlet of the inlet duct in order to prevent the fluid from reaching the sensor member.

These known solutions not satisfactory. Some of them have too many parts and are difficult to assemble, others include parts that are difficult to manufacture. Furthermore as soon as the aim becomes to spare the transmitter in burst pressure situations, the known solutions are damaged, even destroyed, and require replacement.

Burst pressure monitoring devices are also described in the patent applications WO2012/089626A2 and WO01/69194A1.

The aim of the invention is to propose a burst pressure monitoring device intended to be employed in a pressure transmitter, said device being easy to manufacture, simple to assemble and effective in avoiding any damage to the transmitter and to said monitoring device in a fluid burst pressure situation. The proposed device is a universal solution, suited to all the fluid inlet types and to all the pressure ranges, notably in industry.

SUMMARY OF THE INVENTION

This aim is achieved through a burst pressure monitoring device intended to be employed in a pressure transmitter, said pressure transmitter comprising a body, an inlet duct formed on the body and intended to receive a fluid, a sensor member on which the inlet duct emerges, said sensor member being intended to measure a pressure and to deliver an output electrical signal representative of the measured pressure, said burst pressure monitoring device being intended to be positioned inside the inlet duct of the pressure transmitter and comprising two parts assembled together, the two assembled parts forming an internal fluid flow channel comprising one or more successive chicanes.

Advantageously, the two parts are identical.

According to a particular feature, each part has the form of a half-cylinder comprising at least one internal protuberance and one notch.

According to another particular feature, the two parts are assembled head-to-tail, in such a way that a protuberance of one part is fitted into a notch of the other part so as to form said chicane.

According to another particular feature, the device includes an external threading suitable for cooperating with an internal thread produced in the inlet duct of the pressure transmitter.

The invention also relates to a pressure transmitter comprising a body, an inlet duct formed on the body and intended to receive a fluid, a sensor member on which the inlet duct emerges, said sensor member being intended to measure a pressure and to deliver an output electrical signal representative of the measured pressure, and a burst pressure monitoring device housed in said inlet duct, said burst pressure monitoring device conforming to that defined above.

According to a particular feature, the pressure transmitter comprises an internal threading produced in the inlet duct and the burst pressure monitoring device includes an external thread to be screwed into said internal thread.

BRIEF DESCRIPTION OF THE FIGURES

Other features and advantages will emerge from the following detailed description given in light of the appended drawings listed below:

FIGS. 4A and 4B represent, seen in axial longitudinal cross section, the burst pressure monitoring device of the invention according to two possible variants of its internal arrangement.

DETAILED DESCRIPTION OF AT LEAST ONE EMBODIMENT

As is known, a pressure transmitter 1 comprises a body 10 (FIG. 1), an inlet duct 11 formed on the body, said inlet duct 11 being intended to receive a fluid whose pressure is to be measured. The body 10 of the pressure transmitter houses a sensor member (not represented) intended to measure the pressure of said fluid. This sensor member can employ different known techniques. One of these techniques employs, for example, a detecting membrane whose displacement is proportional to the differential pressure. The position of the detecting membrane is, for example, detected by capacitor plates situated on either side of said membrane. The difference in capacity between the detecting membrane and the capacitor plates is electronically converted into an output electrical signal, for example between 4 and 20 mA, said signal being representative of the measured differential pressure. Other measurement techniques can of course be employed. The architecture of the sensor member is not the subject of the present invention, so these techniques are not described in this patent application.

The invention consists in proposing a burst pressure monitoring device 2 that makes it possible to avoid damaging the sensor member, and therefore the pressure transmitter, in a burst pressure situation.

Figure 1:
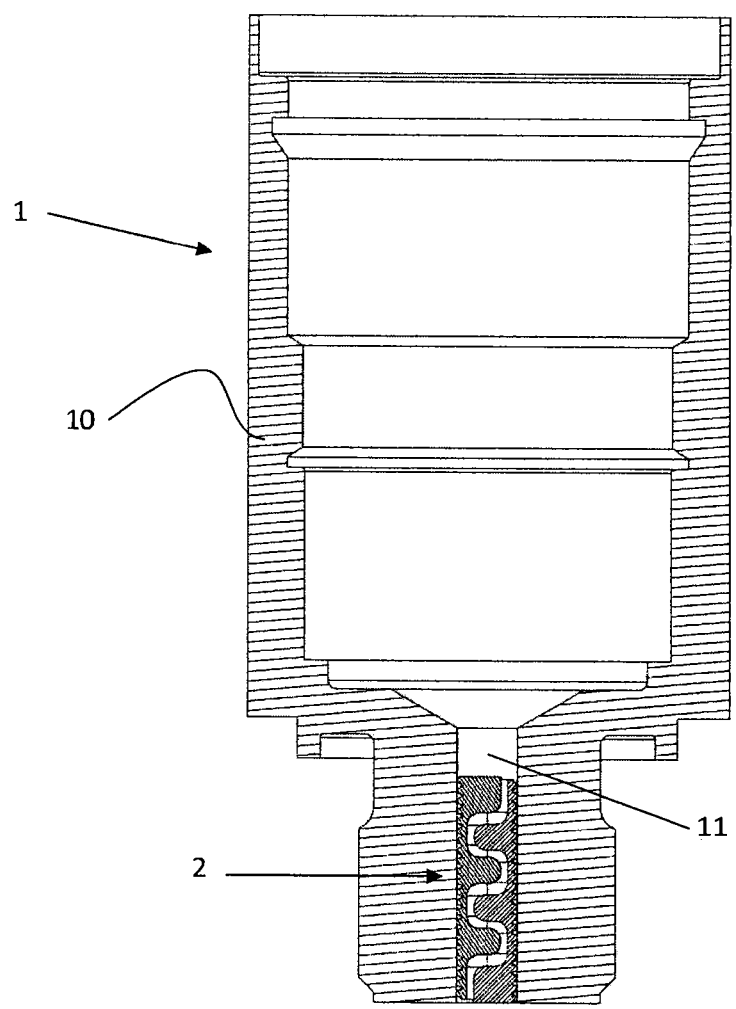
FIG. 1 represents the body of a pressure transmitter, into which is inserted a burst pressure monitoring device according to the invention.
Figure 2:
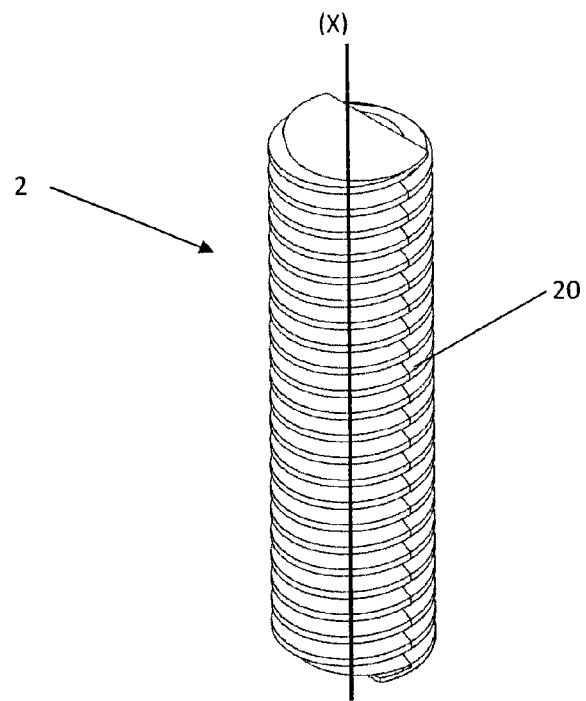
FIG. 2 represents, seen in perspective, the burst pressure monitoring device of the invention.

This burst pressure monitoring device is intended to be positioned axially in the fluid inlet duct 11 of the pressure transmitter 1 (FIG. 1). It has a cylindrical form, the cylinder having an axis (X) of revolution produced in a longitudinal direction, along which the fluid flows. Preferentially, the cylinder includes an external thread 20 (FIG. 2) so as to be able to be screwed into an internal thread produced on the internal surface of the inlet duct 11. Other fastening means could of course be envisaged.

The burst pressure monitoring device is produced in at least two parts assembled together (FIGS. 4A and 4B), for example along an axial longitudinal plane. The two parts 21a, 21b (21 in FIG. 3) are preferentially identical and are assembled together head-to-tail. Each part has, for example, the form of a half-cylinder. Preferentially, the assembly of one part on the other part is done when screwing the burst pressure monitoring device into the internal thread of the transmitter. The assembly between the two parts could of course be done otherwise, for example by employing glue or mechanical fastening means.

According to the invention, the burst pressure monitoring device 2 forms an internal fluid flow channel 22, said channel 22 comprising one or more successive chicanes 220. The chicanes 220 are produced by the internal arrangement of each part 21a, 21b and by the assembly of the parts 21a, 21b together. A "chicane" should be understood to be a portion of the internal channel enabling the fluid to circulate from a duct formed on a first longitudinal plane to a duct formed on a second longitudinal plane, parallel to the first longitudinal plane and distinct therefrom.

Figure 3:
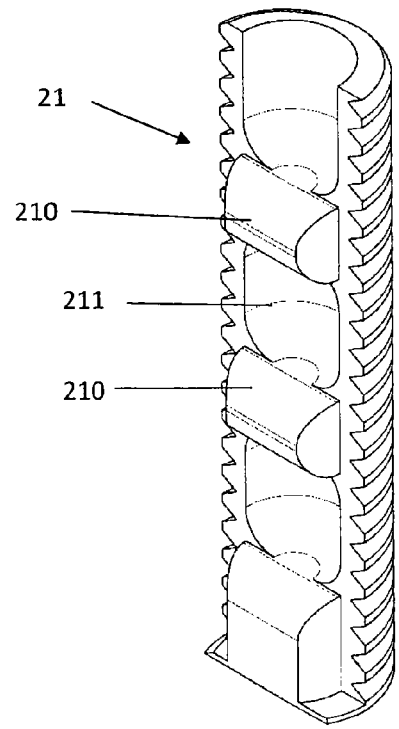
FIG. 3 represents, seen in perspective, a half-shell of the burst pressure monitoring device of the invention.

With reference to FIG. 3, each part 21 has at least two protuberances 210 produced protruding relative to the axial plane of assembly with the other part. Between its two protuberances, each part 21 has a notch 211. Referring to FIGS. 4A and 4B, by assembling the two parts 21a, 21b head-to-tail, a protuberance 210a of the first part 21a is housed in the notch 211b of the second part 21b and the protuberance 210b of the second part 21b is housed in a notch 211a of the first part, thus forming two successive chicanes. To form each chicane 220, the dimensions in the axial direction and in the radial direction of each protuberance 210a, 210b of one part are smaller than the dimensions of the corresponding notch of the other part.

Referring to FIGS. 4A and 4B, depending on the respective dimensions of each protuberance and of the notches, it is possible to vary the dimension of each chicane and adapt the device employed to the type of fluid, notably to its viscosity.

According to the invention, the fluid arriving in the pressure transmitter 1 is thus slowed down by the successive chicanes produced in the burst pressure monitoring device. The solution of the invention proves particularly simple to implement, the two parts being identical and easy to assemble together. Moreover, it is possible to provide devices that have different internal arrangements so as to adapt to the type of fluid whose pressure is measured. Contrary to some solutions of the prior art, the device of the invention is not destroyed in a burst pressure situation and therefore does not need to be replaced after having been subjected to burst pressure.

The invention claimed is:

1. A burst pressure monitoring device intended to be employed in a pressure transmitter, said pressure transmitter comprising a body, an inlet duct formed on the body and intended to receive a fluid, a sensor member on which the inlet duct emerges, said sensor member being intended to measure a pressure and to deliver an output electrical signal representative of the measured pressure, said burst pressure monitoring device being intended to be positioned inside the inlet duct of the pressure transmitter and comprising two identical parts each having the form of a half-cylinder including at least one internal protuberance and one notch, the two parts being assembled together head-to-tail in such a way that the protuberance of one part is fitted into the notch of the other part so as to form a chicane.

2. The burst pressure monitoring device according to claim 1, wherein the device further comprises an external thread suitable for cooperating with an internal thread produced in the inlet duct of the pressure transmitter.

3. A pressure transmitter comprising a body, an inlet duct formed on the body and intended to receive a fluid, a sensor member on which the inlet duct emerges, said sensor member being intended to measure a pressure and to deliver an output electrical signal representative of the measured pressure, and a burst pressure monitoring device housed in said inlet duct, wherein said burst pressure monitoring device is as defined in claim 1.

4. The pressure transmitter according to claim 3, wherein the transmitter comprises an internal thread produced in the inlet duct and in that the burst pressure monitoring device includes an external thread to be screwed into said internal thread.

* * * * *